United States Patent
Wimmer et al.

(10) Patent No.: US 10,501,013 B2
(45) Date of Patent: Dec. 10, 2019

(54) LIGHTING APPARATUS

(71) Applicant: Lisa Draexlmaier GmbH, Vilsbiburg (DE)

(72) Inventors: Markus Wimmer, Mamming (DE); Josef Lang, Kumhausen (DE); Alexandr Zaviyalov, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 190 days.

(21) Appl. No.: 15/524,764

(22) PCT Filed: Oct. 7, 2015

(86) PCT No.: PCT/EP2015/073120
§ 371 (c)(1),
(2) Date: May 5, 2017

(87) PCT Pub. No.: WO2016/071063
PCT Pub. Date: May 12, 2016

(65) Prior Publication Data
US 2017/0349095 A1     Dec. 7, 2017

(30) Foreign Application Priority Data

Nov. 6, 2014   (DE) .................. 10 2014 116 180

(51) Int. Cl.
*B60Q 3/54* (2017.01)
*F21V 5/00* (2018.01)
(Continued)

(52) U.S. Cl.
CPC ................. *B60Q 3/54* (2017.02); *B60Q 3/74* (2017.02); *F21V 5/005* (2013.01); *G02B 3/005* (2013.01);
(Continued)

(58) Field of Classification Search
CPC ........ B60Q 3/54; B60Q 3/74; B60Q 2500/10; F21V 5/005; G02B 3/005; G02B 3/0068; G02B 19/0061
(Continued)

(56) References Cited

U.S. PATENT DOCUMENTS

| 8,757,849 B2 | 6/2014 | Brick et al. |
| 2006/0209428 A1* | 9/2006 | Dobbs ................. G02B 3/0025 359/741 |

(Continued)

FOREIGN PATENT DOCUMENTS

| CN | 203036552 U | 7/2013 |
| DE | 10 2007 056 402 A1 | 5/2009 |

(Continued)

OTHER PUBLICATIONS

International Search Report in Application No. PCT/EP2015/073120, dated Dec. 15, 2015.
(Continued)

*Primary Examiner* — Anh T Mai
*Assistant Examiner* — Jessica M Apenteng
(74) *Attorney, Agent, or Firm* — Finnegan, Henderson, Farabow, Garrett & Dunner LLP

(57) ABSTRACT

The present disclosure describes a lighting system for vehicle interiors, comprising a light source that emits visible light and a component arranged relative to the light source in such a manner that light emitted from the light source passes through it. The lighting system further comprises a transparent substrate with a surface area through which light emitted from the light source passes, and a lenticular screen structure having a plurality of regularly arranged lens elements and being formed on the surface area of the transparent substrate. The present disclosure also describes using the lighting system and its component to illuminate the
(Continued)

interior of vehicles, wherein generated three-dimensional lighting effects can be perceived differently by a viewer/occupant in the interior space, depending on the angle of viewing.

17 Claims, 3 Drawing Sheets

(51) Int. Cl.
  *G02B 3/00* (2006.01)
  *G02B 19/00* (2006.01)
  *B60Q 3/74* (2017.01)

(52) U.S. Cl.
  CPC ....... *G02B 3/0068* (2013.01); *G02B 19/0061* (2013.01); *B60Q 2500/10* (2013.01)

(58) Field of Classification Search
  USPC ........................................................ 362/488
  See application file for complete search history.

(56) References Cited

U.S. PATENT DOCUMENTS

| 2006/0285312 | A1  | 12/2006 | Ogawa et al. |
| 2010/0165619 | A1* | 7/2010  | Kawato ............... F21V 3/00 362/235 |
| 2014/0240839 | A1* | 8/2014  | Yang ................ G02B 3/0043 359/599 |

FOREIGN PATENT DOCUMENTS

| DE | 10 2010 031 192 A1 | 1/2012  |
| DE | 20 2012 102 603 U1 | 10/2012 |
| DE | 10 2012 018 517 A1 | 3/2013  |
| DE | 10 2012 107 082 A1 | 2/2014  |
| DE | 10 2013 016 842 A1 | 6/2014  |
| EP | 2 139 013 A1       | 12/2009 |

OTHER PUBLICATIONS

German Office Action for German Application No. 10 2014 116 180.7, dated Mar. 2, 2015.

\* cited by examiner

LIGHTING APPARATUS

CROSS-REFERENCE TO RELATED APPLICATIONS

This application is a national phase of International Application No. PCT/EP2015/073120, filed on Oct. 7, 2015, which claims priority to German Patent Application No. 10 2014 116 180.7, filed on Nov. 6, 2014. The contents of the above-referenced applications are expressly incorporated herein by reference to their entireties.

TECHNICAL FIELD

The present invention relates to a lighting system for vehicle interiors, particularly for the purpose of generating 3D lighting effects in vehicle interiors. It also relates to the use of this lighting system and to a method for producing a component of a lighting system.

BACKGROUND

Fabric materials are known from the prior art, in which transparent warp threads are woven in and arranged in parallel, resulting in a three-dimensional lighting effect that is generated when visible light shines through this fabric. Moreover, the 3D lighting effects may be perceived differently, depending on the position of a viewer relative to the fabric. The 3D lighting effects are generated on the basis of the transparent warp threads acting as rod lenses that correspondingly refract the light passing through.

Displays dependent on the angle of viewing can also be created by what is referred to as parallax barrier and lenticular screen techniques. Arranging parallax barriers or lens elements in a certain way allows a viewer to perceive different parts of (image) structures located behind the barriers or lenses, depending on the viewing angle. For example, with the lenticular screen technique a three-dimensional depth effect can be imparted to two-dimensional printed products or the appearance of motion effects can be created.

In contrast to this, the prior art does not yet reveal that 3D lighting effects are used for special lighting effects in vehicle interiors. The fabrics described above are utilized primarily as design elements in architecture. These fabrics appear to be less suitable for use in lighting systems for vehicle interiors. The reason for this, among other things, is that such fabrics generally are not stabilized and the transparent warp threads shift easily when touched, which could result in losing the lighting effect. Also, such fabrics cannot be coated, since they are not 3D-deformable. Even the slightest distortions could negatively impact the lighting effect. Furthermore, demands specifically relating to vehicles, such as in the "fingernail test" and the "sun lotion test" are not met by such fabrics. Moreover, generating the 3D lighting effect using flat fabrics requires a relatively large installation space.

SUMMARY OF THE DISCLOSURE

It is the object of the present invention to provide a lighting system that generates 3D lighting effects in vehicle interiors and that meets the demands on materials that are specific to automotive engineering.

The object is achieved by the features of claim 1. Advantageous embodiments and practical applications are found in the relevant dependent claims, the following description and in the drawings.

Another object of the present invention is to provide a method for manufacturing a component of a lighting system. This object is carried out by the features of claim 11.

The present invention is based on the idea that "ambient lighting" is becoming ever more firmly established as a luxury element especially for automobile interiors. Therefore, in further developing this technology it would be desirable to transfer and apply the 3D lighting effects used in architecture to vehicle interiors. However, to achieve this it is necessary for the relevant lighting systems not only to meet dimensional requirements of automotive engineering, but also for them to be reliably and consistently usable in automotive engineering applications. The desired lighting effects here should be guaranteed for the entire lifetime of the vehicle and for the usual scenarios in which they are used.

The lighting system for vehicle interiors in accordance with the invention comprises a light source that emits visible light and a component that is arranged relative to the light source in such a way that light emitted by the light source radiates or passes through the component. The component comprises a transparent substrate with a surface area through which light emitted from the light source passes, and a lenticular screen structure that has a plurality of uniformly arranged lens elements and is formed on the surface area of the transparent substrate.

The above-mentioned vehicle interiors are understood here to include interiors of land vehicles, aquatic vehicles and aircraft, as well as generally all systems intended for passenger transportation. The following description is given as an example of the interiors of passenger cars in particular; this is intended as an illustration only and is by no means to be interpreted as a limitation.

The aforementioned light source is preferably arranged to emit light in the direction of the component. This light radiates through the substrate and the lenticular screen structure. The lighting system according to the invention preferably distinguishes between a front (visible side) and a back. The front is the side facing the viewer/occupant in the interior of the vehicle. Therefore, it is visible, while the back of the lighting system is generally built into the vehicle and is not visible from inside the vehicle when installed. Referred to the above definition of front and back, the light source is located at the back of the lighting system and emits its light from the back to the front of the lighting system, making it possible for a viewer/occupant inside the interior of the vehicle to perceive the light accordingly.

The light emitted from the light source is visible light, i.e. light that can be perceived by the human eye. The materials and structures of the substrate and of the lenticular screen structure must be selected and adapted accordingly. PMMA and PC are mentioned here as examples of materials for the substrate. The component described above represents an advantageous combination of lenticular screen structure and substrate that meets the demands specific to motor vehicles. In the case of vehicles for passenger transportation it must be assumed that the major portion of the equipment in the interior is subject to interaction with the occupants and must withstand the same accordingly, without sacrificing functionality and quality of appearance. The lenticular screen structure and the generated 3D lighting effects are suitably stabilized by the application of the lenticular screen structure to the substrate. Thus, the lighting effects cannot be "destroyed" through ordinary interaction with the vehicle occupants. They are also resistant to the usual action of media on the interior. In this way, the component also easily complies with the relevant (surface) standards for automotive applications, such as the "fingernail test" and the "sun lotion test." Furthermore, high-quality components haptic and optics emerge that are especially well suited for the luxury automobile sector, particularly whenever component surfaces are provided with additional layers.

The light source is preferably a punctiform light source, more preferably an LED. To display expansive 3D lighting effects, several light sources may be combined any number of ways and arranged on the back of the lighting system as described. LEADS are advantageous due to their long life, sturdiness, low energy consumption, good conformability, and compact size. It is also contemplated to combine differently colored LEADS together or to use multi-colored LEADS to produce 3D lighting effects with different colors and lighting moods. However, other light sources and/or combinations of several light sources of any kind are also covered by the present invention as long as the corresponding 3D lighting effects can be produced with them.

Furthermore, the lenticular screen structure is preferably arranged on a surface area of the substrate that faces the light source and/or the lenticular screen structure is formed on a surface area of the substrate that faces away from the light source. Of course it is also possible to provide the lenticular screen structure only on one substrate side through which light passes. Furthermore, it is not necessary to cover the entire light-permeated substrate surface area with the lenticular screen structure. It may rather suffice to provide only sections thereof with a lenticular screen structure. The "facing" surface area of the substrate is the surface area lying directly opposite and turned toward the light source. If applied to the above-described installation of the lighting system into a vehicle, this would be the substrate surface area that faces away from the interior of the vehicle and is oriented toward the light source, pointing in the direction of installation of the lighting system. The substrate surface area "facing away" does not lie directly opposite the light source, since at least the thickness of the substrate still lies between the surface area and the light source. Thus, this substrate surface area points in the direction of the interior of the vehicle and faces the viewer/occupant, away from the light source itself. The 3D lighting effects obtained can be adapted to meet individual design wishes by applying the lenticular screen structure to two opposing surface areas of the transparent substrate, with the light emitted from the light source passing through each one in succession. One example of this is the generation of different light patterns by offset superimposition of the second lenticular screen structure.

If the lenticular screen structure is applied to multiple sides, it can also be advantageous for it to be arranged on two opposite surface areas of the substrate, through both of which (e.g., surface area facing and facing away) the same light passes/radiates in succession from the light source, and these lenticular screen structures are laterally offset from one another in a cross-sectional direction of the component. This may mean that the lenticular screen structures are laterally offset from one another in the component cross-section in the direction in which the light radiates through them. The result of this is that the crests of the outer contours of the lenticular screen elements do not lie on a common axis perpendicular to the substrate (normal). With this arrangement even more widely varied lighting effects can be produced. Thus, it is in keeping with the present invention that the component includes an extremely wide variety of design possibilities. As already indicated above, the lenticular screen structure can be provided on one or more surface areas of the substrate and/or it can be provided completely or partly on the corresponding surface areas. It is also possible to combine different lenticular screen structures on different surface areas or on one and the same surface area of the substrate to obtain widely varied 3D lighting effects.

It is also preferable for a compensating layer to be provided to form an even surface at least on parts of the lenticular screen structure. It is also preferable for an additional layer that is different from the compensating layer, such as a decor layer, to be provided and preferably coated. Here the coarse surface often encountered in lenticular screen structures is evened up by the compensating layer in such a manner that a smooth surface is created onto which other layers may be applied in turn. One example of how this layer can be applied is to coat the component. Neither the compensating layer nor the layer applied to it is particularly limited with regard to its type. They orient themselves toward the individual requirements of the vehicle interiors for which the lighting system is intended. It must merely be ensured that the 3D lighting effect is not overly impacted negatively by the additional layers. The above embodiments with the additional layers are particularly suitable in instances in which the lenticular screen structure is located at the front/visible side of the lighting system.

It is also advantageous for the light source to be situated at a distance of at least 5 mm from the lenticular screen structure closest to it. The distance of the light source from the component of the lighting device should be selected within the context of considerations that include compact size, ease of implementation in vehicle interiors, and adequate generation and display capabilities of the 3D lighting effects. Regarding the latter, a minimum distance of 5 mm has proven to be particularly advantageous and results in an acceptable form of 3D lighting effects and at the same time favorable size of the installed lighting system. As the distance between the light source and the lenticular screen structure increases, the lighting effects become more strongly defined, the light lines generated are longer and the depth effects of the light pattern are more pronounced. The maximum distance from the light source results primarily from constructional limitations, as the lighting system should generally be installed compactly and only a limited space is available. The distance of the light source from the lenticular screen structure can range between the aforementioned minimum spacing and the maximum distance, which is primarily dictated by constructional considerations. If the distance falls below the minimum x the result may be a focused illumination of the component, and the 3D lighting effect will appear to be too localized or too weak.

It is also preferable for the lenticular screen structure to be made from a lenticular foil or web.

It has been shown that lens elements with a linear shape are best suited to form a lenticular screen structure that generates three-dimensional effects. Thus, the lens elements form elongated structures and their elongation exceeds many times their width. The result of this is a corresponding aspect ratio. The lines formed by the lens elements can be straight or wave like, depending on the desired effect.

In addition, the linear lens elements may have a substantially semicircular or circular-arc-shaped cross-sectional profile which acts as a lens. The cross-sectional profile can be elliptical, hyperbolic or parabolic in shape. In this connection it has been shown that a cross-sectional profile with a conic constant for a spherical lenses between −0.5 and −1 are particularly well suited for the lenticular screen structure of the invention, as three-dimensional lighting effects can also be produced with this cross-sectional profile when the light source is arranged at only a short distance from the lenticular screen structure. The effect can be further improved if the cross-sectional profile has a radius of curvature of 75 to 150 µm, preferably 90 to 110 µm.

Each circular-arc-shaped element may have additional cross-sectional material shares that lie within the lenticular screen structure and do not form an optical boundary surface; i.e. Light passes through them without refractory effects. Their primary purpose is to hold the circular-arc-shaped elements together. The lenticular screen structure is generally arranged on the substrate material in such a way that the boundary surface between the substrate material and the lenticular screen structure is formed not by the circular-arc-shaped elements, but rather by the remaining cross-sectional material shares. The result is a continuous, uninterrupted optical boundary surface.

Furthermore, the lenticular screen structure can have lens elements that differ in shape from one another. For instance, it is possible that the lenticular screen structure may have a first and a second marginal section, in each of which one lens element is rectilinear. In this connection it is preferable that the rectilinear lens elements also represent the outermost lens elements. It may also be advantageous if the rectilinear lens element of the first marginal section extends parallel to the rectilinear lens element of the second marginal section. In this context, rectilinear may be understood to mean that the lens element is completely straight in its longitudinal direction and has no curves or bends. A middle section can be arranged between the first and the second marginal section. The middle section has at least one wavelike lens element.

To produce a three-dimensional lighting effect having a homogenous appearance, it may be advantageous if transitional elements are arranged between the rectilinear lens element of the particular marginal section and the wavelike lens element of the middle section. These transitional elements create a fluid transition between the rectilinear lens element of the particular marginal section and the wavelike lens element. In this connection, starting from one of the linear lens elements, the transitional elements can adapt slightly more to the shape of the wavy lens element from one transitional element to the next. As a result, the transitional element that is arranged directly adjacent to the rectilinear lens element is virtually straight, while a transitional element located directly adjacent to the wavy lens element describes virtually the same wavy shape. The transitional elements themselves can likewise be embodied from linear transparent lens elements.

An advantage is achieved if the distances between the transitional elements from one of the rectilinear lens elements to the wavelike lens element are constant, particularly in a cross-sectional direction extending perpendicular to the rectilinear lens element. At the same time, the size of these constant distances may vary over a direction of longitudinal extension of the transitional elements. In this way it is ensured that the three-dimensional lighting effects which can be produced through the lenticular screen structure have no inhomogeneous elements.

It is also advantageous if the transitional elements situated between the rectilinear lens element of the first marginal section and the wavelike lens element of the middle section are spaced at a smaller distance apart than the transitional elements situated between the rectilinear element of the second marginal section and the wavelike lens element of the middle section. This applies at least in sections in a cross-sectional direction that extends perpendicularly to the rectilinear lens elements of the first and second marginal sections.

The lenticular screen structure of the present invention can also be referred to as a lenticular structure or lenticular optics. It may be understood as a uniform, regular arrangement of lens elements, particularly in the case of linear or wavelike lens elements. To generate a 3D lighting effect it is preferable for the lens elements to be in regular, uniform arrangement adjacent to one another in the cross-sectional direction. As long as this is ensured, it is also contemplated that the individual elongated lens elements may not be strictly linear in their longitudinal direction, but rather they may be curved in any way or circular.

Regular, directly bordering lens elements then describe a curved course for the collective entirety of the lens elements (lenticular screen structure). Thus, more complex geometries of the component of the lighting system are conceivable with no loss of the 3D lighting effect. This is particularly advantageous in designing complex interior components for passenger cars, in which such components generally do not consist simply of plate-like parts, but are rather parts of complex 3D structures. Each of the above semicircular lens elements advantageously has a minimum diameter of approximately 100 µm, which ensures that not only the individual lens elements, but also the lenticular screen structure as a whole retain good stability and sturdiness while maintaining an adequate 3D lighting effect. The optional upper limit of the diameter of the lens elements is approximately 3 mm and a diameter range preferably extends from approximately 100 µm to approximately 3 mm.

It is also advantageous for the lens elements to have diameters differing from one another, preferably by bundles with different diameters. By purposefully varying the diameters within the lenticular screen structure or among different lenticular screen structures, the 3D lighting effects can be specifically optimized and altered to permit complex light patterns to be displayed.

With reference to the production of the component of the lighting system it is particularly advantageous and cost-effective to manufacture the component primarily in one single production step. For example, this can be achieved by introducing or fitting the lenticular screen structure into a molding tool to form the component, then feeding the material of the transparent substrate part to the molding tool and molding it accordingly. At the same time, in accordance with the in-situ principle, the lenticular screen structure is formed on at least one surface area of the transparent substrate. If a lenticular screen structure foil is used, then a molding tool can first of all be lined with the foil, then the substrate material is molded with this lined mold. The result is a composite material consisting of the transparent substrate and the lenticular screen foil. As an alternative it would also be conceivable for the lenticular screen structure to be impressed into a material of the lenticular screen structure or to be introduced into it by various shaping procedures. Injection molding or injection-compression molding processes are mentioned here as examples of possible shaping processes.

Finally, the present invention includes the use of the above described lighting system and of the component for illuminating the interior of land vehicles, aquatic vehicles and/or aircraft and/or in general any equipment for passenger transportation. It is also preferred to utilize the lighting system in cockpit structures of passenger cars. Through the use of the lighting system and of the component, 3D lighting effects for "ambient lighting" in vehicle interiors are to be produced which can be perceived by an occupant and in which the display preferably varies depending on the angle of viewing.

EXAMPLE EMBODIMENTS

Preferred embodiments of the present invention will now be described with reference to the accompanying drawings. However, the invention shall not be restricted to these embodiments alone.

Figure 1:
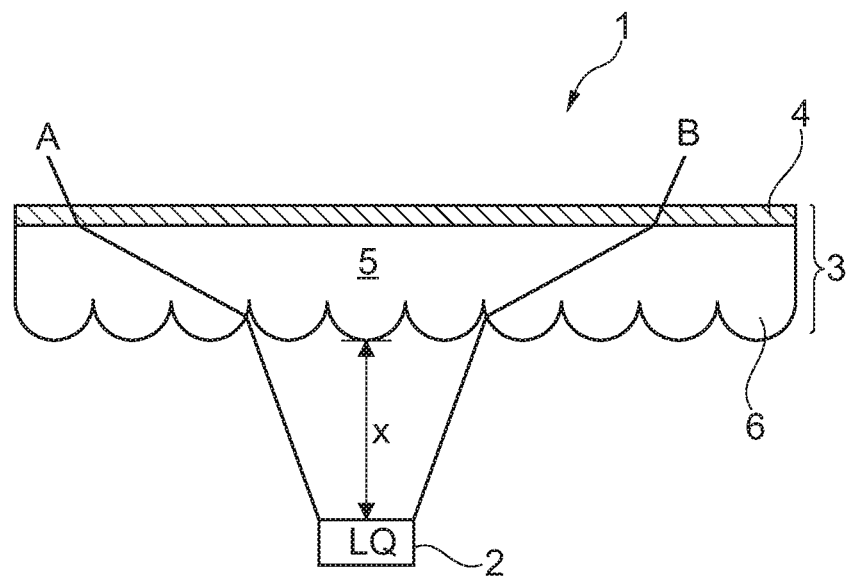
FIG. 1 shows a schematic cross-sectional view of a lighting system according to the present invention.
Figure 2:
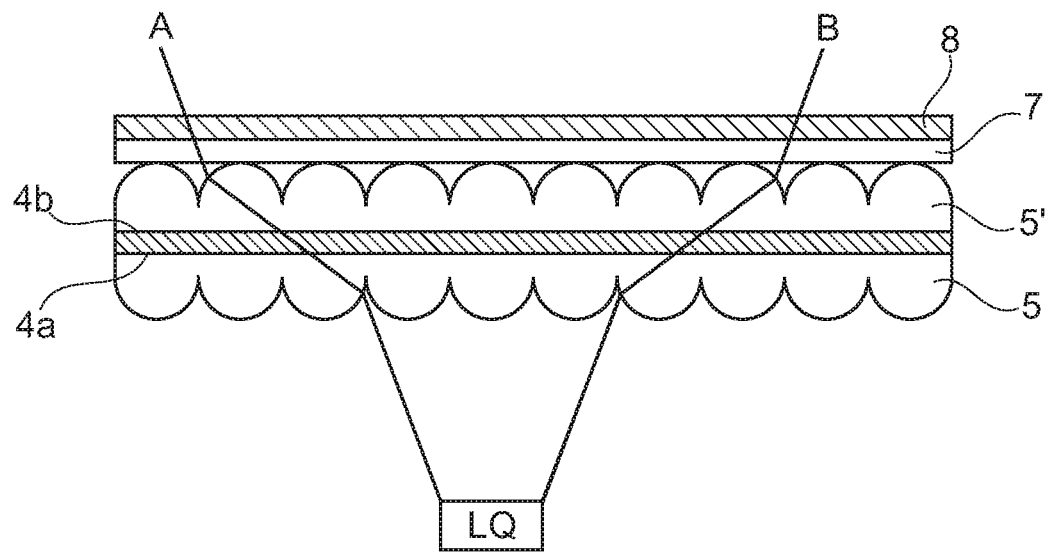
FIG. 2 shows a schematic cross-sectional view of another lighting system according to the present invention.

FIG. 1 shows one example of an embodiment of the above-given lighting system 1, comprising a light source 2 and a component 3 composed of a transparent substrate 4 and a lenticular screen structure 5. The lens elements 6 of the lenticular screen structure 5 are schematically indicated accordingly by semicircular structures 6. In FIG. 1 it can be seen that the light source 2 is arranged to emit its light in the direction of the component 3, toward the visible side. This light passes or radiates through the transparent substrate 4 and the lenticular screen structure 5. FIG. 1 also reveals that to produce the 3D lighting effect it is necessary for at least a portion of the light to pass through the lenticular screen structure 5, which is an optically active component and which refracts and deflects the light passing through it. As examples of this, schematic beam paths A and B are shown in FIGS. 1 and 2. The largest expansions of light here are achieved perpendicularly to the longitudinal direction of the lens elements (see lens paths described above). The minimum distance of the light source is indicated in FIG. 1 with the reference symbol x. In this example, the closest lenticular screen structure 5 is the one on the side of the transparent substrate 4 facing the light source 2.

FIG. 2 illustrates another aspect of the present invention in which the lenticular screen structure 5 is embodied on multiple sides or rather on both sides of the substrate 4. FIG. 2 suggests this by showing the substrate 4 with the lenticular screen structures 5 and 5'. Light passes through these two lenticular screen structures 5, 5' in succession from the back to the visible side of the lighting system 1, with each lenticular screen structure contributing to the modification of this light. In addition, to facilitate understanding of the terms "facing away from" and "facing" as introduced above in relation to the surface area of the substrate 4, FIG. 2 also includes the reference numbers 4a and 4b. The "facing" surface area of the substrate 4 is the area 4a lying directly opposite the light source 2. By contrast, the substrate surface area 4b does not lie directly opposite the light source, since at least the thickness of the substrate 4 lies between it and the light source. The surface area 4b is oriented toward the interior of the vehicle and faces the viewer/occupant, but it faces away from the light source 2.

Figure 3:
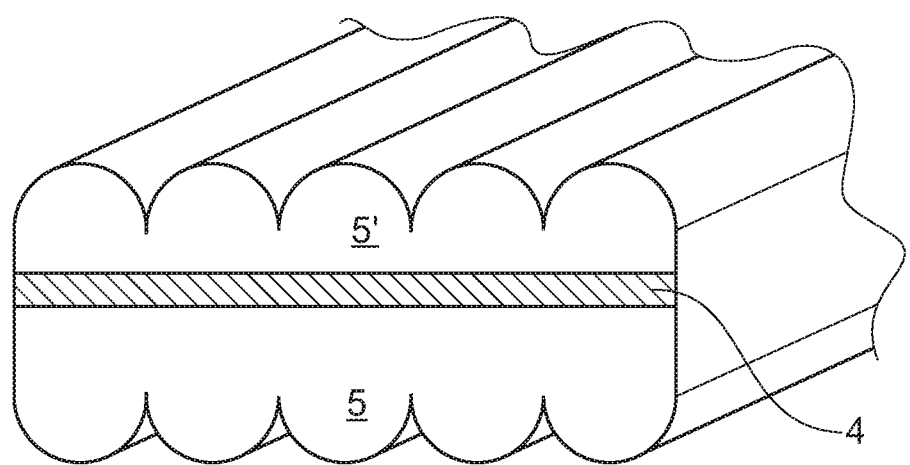
FIG. 3 shows a schematic cross-sectional view of a component of a lighting system according to the present invention.

FIG. 2 and FIG. 3 schematically show that the lenticular screen structures 5 and 5' provided on either side are arranged in mutual alignment in the cross-sectional direction of the component 3. That means that the semicircular lens elements shown therein are laterally oriented to one another in a direction perpendicular to the component 3 in such a way that the semicircles of the lens elements on the two sides would form a complete circle if the substrate 4 were not lying in between. However, the present invention also includes lenticular screen structures that are not in alignment in which, for example, the semicircular lens elements are mutually offset laterally in the cross-sectional direction of the component 3 in such a manner that no exact circle would be created. In other words, the crests of the outer contours of the lens elements would not lie on a common normal of the component 3.

FIG. 2 likewise illustrates a compensating layer 7 on the lenticular screen structure, to smooth the frequently coarse surface of the same and to enable application of a decor layer 8, for example. It is not intended for the substrate material to be provided on the lenticular screen structure 5 in the sense of arranging the compensating layer 7 as illustrated in FIG. 2, i.e. on the semicircular elements. The reason is that, as described above, a homogenous, continuous optical boundary surface is to be formed between the substrate 4 and the lenticular screen structure, but this would not be possible due to the roughness of the outer surface of the lenticular screen structure.

Figure 4:
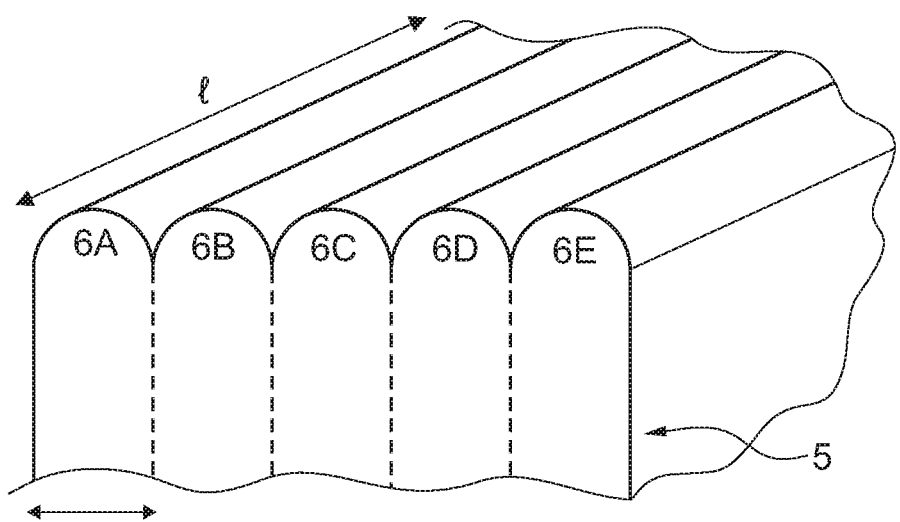
FIG. 4 shows a schematic cross-sectional view of a lenticular screen structure of a lighting system according to the present invention.

FIG. 4 shows a perspective cross-sectional view of a lenticular screen structure 5 with the individual lens elements 6A to 6E arranged continuously, laterally adjacent to one another in a cross-sectional direction. In addition, the perspective views in FIG. 3 and FIG. 4 reveal that the lens elements 6A-6E are elongated structures. That means that their longitudinal extension/exceeds a multiple of their width b. As described above, these elongated structures do not have to extend along/in a strictly linear fashion, but they may also extend on a curved or even circular path. However, it is particularly preferred for the lens elements 6A to 6E to be arranged laterally directly adjacent one another, i.e. along line b in the cross-sectional direction, and to extend continuously.

Figure 5:
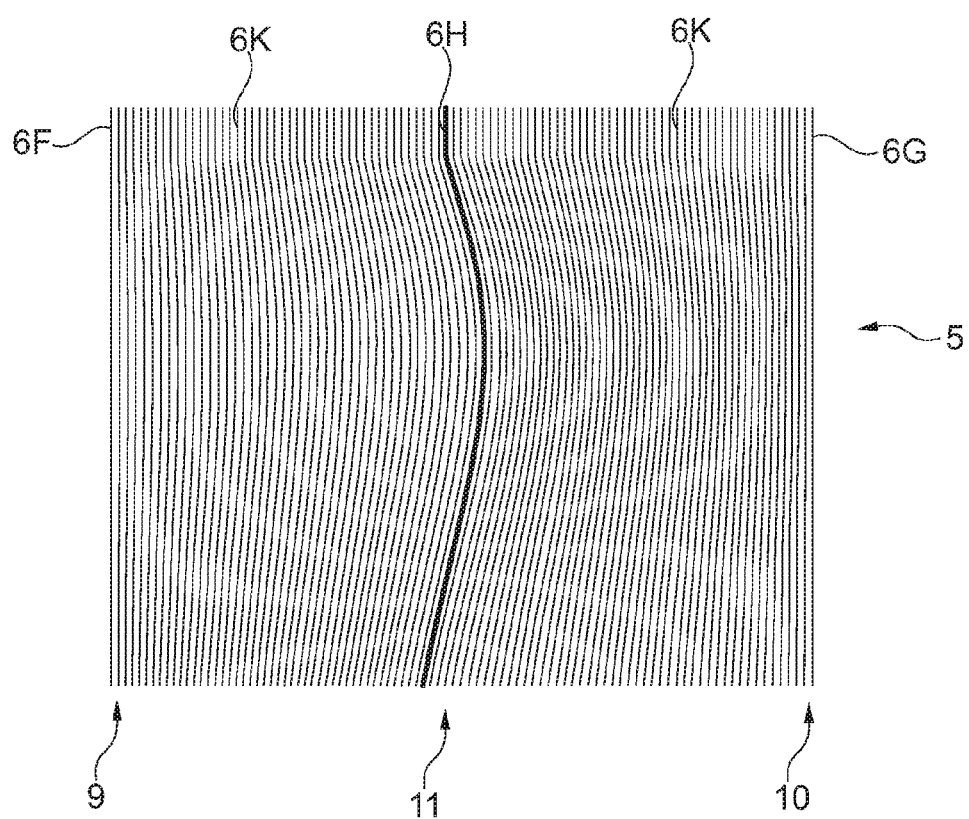
FIG. 5 shows a schematic plan view onto a lenticular screen structure of a lighting system according to the present invention.

FIG. 5 shows a plan view of a schematic representation of the lenticular screen structure 5. The lens elements 6 here are shown as lines. A plurality of lens elements 6 that differ in shape are arranged over the entire surface area of the lenticular screen structure 5. Furthermore, the lenticular screen structure 5 is comprised of a first and a second marginal section 9, 10. A middle section 11 is arranged between the marginal sections 9, 10. The first and the second marginal sections 9, 10 possess a rectilinear lens element 6F, 6G, which at the same time also represents the outermost lens elements 6 of the lenticular screen structure 5. The middle section 11 on the other hand possesses a wavelike lens element 6H. For the sake of clarity both the wavelike lens element 6H and the rectilinear lens elements 6F and 6G are highlighted by thicker lines.

Transitional elements 6K are arranged on the lenticular screen structure 5 for a smooth transition between the wavelike lens element 6H and the rectilinear lens elements 6F, 6G. Starting from the rectilinear lens elements 6F, 6G, each transitional element 6K somewhat more closely adapts to the shape of the wavelike lens element 6H. With this transition from a rectilinear to a wavy shape of the lens elements 6, a particularly strong three-dimensional effect is produced, provided that a light source is arranged behind the lenticular screen structure 5. This effect is already visible when the light source is arranged at only a short distance from the lenticular screen structure. In addition, the impinging light is widely distributed, so that even in the case of a close arrangement of a light source at the lenticular screen structure, no inhomogeneous light occurs.

The transitional elements 6K arranged between the respective rectilinear lens elements 6F, 6G and the wavy lens element 6H are arranged at uniform distances from one another in a cross-sectional direction extending perpendicular to the rectilinear lens elements 6F, 6G. However, in the longitudinal direction the size of this constant spacing varies. Also, the transitional elements 6K situated between the rectilinear lens element 6F of the first marginal section 9 and the wavelike lens element 6H of the middle section 11 are arranged at a different constant distance apart than the transitional elements 6K situated between the rectilinear lens element 6G of the second marginal section 10 and the wavelike lens element 6H of the middle section 11.

LIST OF REFERENCE SIGNS 1 lighting system
2 light source
3 component
4 substrate
5 lenticular screen structure
6 lens element
7 compensating layer
8 decor layer
9 first marginal section
10 second marginal section
11 middle section

What is claimed is:

1. A lighting system for a vehicle interior, comprising:
a light source configured to emit visible light; and
a component arranged relative to the light source such that light emitted by the light source radiates through the component, the component comprising:
a transparent substrate having a surface through which light emitted from the light source radiates through;
a lenticular structure disposed on the surface of the transparent substrate, the lenticular structure comprising a plurality of lens elements arranged in a pattern having first and second ends; and
wherein the lenticular structure comprises:
a first marginal section having a first rectilinear lens element as an outermost lens element at the first end;
a second marginal section having a second rectilinear lens element as an outermost lens element at the second end;
a middle section arranged between the first and second marginal sections, the middle section having a wavelike lens element; and
transitional lens elements arranged between the first rectilinear lens element and the wavelike lens element and between the second rectilinear lens element and the wavelike lens element, the transitional lens elements configured to create a transition between each of the first and second rectilinear lens elements and the wavelike lens element.

2. The lighting system according to claim 1, wherein the light source is at least one of a punctiform light source and an LED.

3. The lighting system according to claim 1, wherein the lenticular screen structure is disposed on a surface of the substrate facing the light source.

4. The lighting system according to claim 1, wherein the lenticular screen structure is disposed on a surface of the substrate facing away from the light source.

5. The lighting system according to claim 1, wherein:
the transparent substrate includes a first surface and an opposing second surface; and
the lenticular screen structure comprises a first lenticular screen structure disposed on the first surface and a second lenticular screen structure disposed on the second surface, such that a beam of light is configured to pass through the first surface and the second surface in succession.

6. The lighting system according to claim 5, wherein the first lenticular screen structure is laterally offset from the second lenticular screen structure in a cross-sectional direction of the component.

7. The lighting system according to claim 1, comprising:
a compensating layer provided at least partly on the lenticular screen structure, the compensating layer configured to form an even surface; and
a decor layer provided on the compensating layer.

8. The lighting system according to claim 1, wherein the light source is spaced at a distance of at least 5 mm from the closest lenticular screen structure.

9. The lighting system according to claim 1, wherein the lenticular screen structure comprises at least one of a lenticular screen foil or web.

10. The lighting system according to claim 1, wherein the lens elements have an essentially semicircular, parabolic, hyperbolic or elliptical cross-sectional profile.

11. The lighting system according to claim 10, wherein the cross-sectional profile of the lens elements has a radius of curvature of 75 to 150 µm or 90 to 110 µm.

12. The lighting system according to claim 10, wherein the cross-sectional profile of the lens elements has a conic constant between −0.5 and −1.

13. The lighting element according to claim 1, wherein distances between the transitional elements are constant, and distances across a longitudinal section of the transitional elements vary.

14. The lighting element according to claim 1, wherein the lighting system is configured to generate three-dimensional lighting effects that are perceived differently depending on a viewing angle of an occupant in the interior space.

15. A method for producing a component of a lighting system for a vehicle interior, the method comprising the following steps:
inserting a lenticular screen structure into a molding tool for shaping the component, the lenticular structure comprising a plurality of lens elements arranged in a pattern having first and second ends;
feeding material of a transparent substrate into the molding tool;
molding the material of the substrate to form a transparent substrate; and
forming the lenticular screen structure on at least one surface area of the transparent substrate, and
wherein the lenticular structure comprises:
a first marginal section having a first rectilinear lens element as an outermost lens element at the first end;
a second marginal section having a second rectilinear lens element as an outermost lens element at the second end;

a middle section arranged between the first and second marginal sections, the middle section having a wavelike lens element; and transitional lens elements arranged between the first rectilinear lens element and the wavelike lens element and between the second rectilinear lens element and the wavelike lens element, the transitional lens elements configured to create a transition between each of the first and second rectilinear lens elements and the wavelike lens element.

16. A component of a lighting system for a vehicle interior, comprising:

a transparent substrate having a surface through which light emitted from a light source radiates through; and a lenticular structure disposed on the surface of the transparent substrate, the lenticular structure comprising a plurality of lens elements arranged in a pattern having first and second ends, wherein the lens elements include elongated structures arranged laterally adjacent one another, and wherein the lenticular structure comprises:

a first marginal section having a first rectilinear lens element as an outermost lens element at the first end;

a second marginal section having a second rectilinear lens element as an outermost lens element at the second end;

a middle section arranged between the first and second marginal sections, the middle section having a wavelike lens element; and transitional lens elements arranged between the first rectilinear lens element and the wavelike lens element and between the second rectilinear lens element and the wavelike lens element, the transitional lens elements configured to create a transition between each of the first and second rectilinear lens elements and the wavelike lens element.

17. The component according to claim 16, wherein:

the transparent substrate includes a first surface and an opposing second surface; and the lenticular screen structure comprises a first lenticular screen structure disposed on the first surface and a second lenticular screen structure disposed on the second surface, such that a beam of light is configured to pass through the first surface and the second surface in succession.

* * * * *